United States Patent
Hollenbach et al.

[11] Patent Number: 5,877,565
[45] Date of Patent: Mar. 2, 1999

[54] COMMUNICATION CARD WITH TELEPHONE LINE INTERLOCK AND CELLULAR INTERCONNECT

[75] Inventors: Keith Eugene Hollenbach, Kutztown; Donald Raymond Laturell, Upper Macungie; Steven Brooke Witmer, Sinking Spring, all of Pa.

[73] Assignee: Lucent Technologies, Inc., Murry Hill, Del.

[21] Appl. No.: 28,473

[22] Filed: Feb. 24, 1998

[51] Int. Cl.$^6$ .................................................. H01R 23/02
[52] U.S. Cl. ..................... 307/119; 395/282; 395/750.06; 439/133; 439/344
[58] Field of Search ............................ 307/119; 439/329, 439/946, 344, 133, 131, 217; 395/282, 750.06; 364/705.05

[56] References Cited

U.S. PATENT DOCUMENTS

| | | |
|---|---|---|
| 5,183,404 | 2/1993 | Aldous et al. . |
| 5,404,268 | 4/1995 | O'Connor .............................. 439/217 |
| 5,499,923 | 3/1996 | Archibald et al. . |
| 5,505,633 | 4/1996 | Broadbent .............................. 439/329 |
| 5,708,833 | 1/1998 | Kinney et al. ...................... 364/705.05 |
| 5,727,972 | 3/1998 | Aldous et al. .......................... 439/946 |
| 5,768,605 | 6/1998 | Fuller et al. ....................... 395/750.06 |
| 5,773,332 | 6/1998 | Glad ...................................... 439/344 |

*Primary Examiner*—Albert W. Paladini

[57] ABSTRACT

The present invention provides an interlocking connector for a communication card including a first connection portion for connection to signals in the communication card relating to a first device such as a cellular telephone. A second connection portion in the interlocking connector provides for connection to signals in the communication card relating to a second device such as the PSTN. A blocking portion of the interlocking connector prevents electrical connection with the second connection portion and allows electrical connection with the first connection portion when the interlocking connector is connected to the communication card. A communication card is also provided which comprises modem circuitry, and an interface for connection between the modem circuitry and a computing device. A PSTN interface is provided for connection between the modem circuitry and a telephone line, and a cellular telephone interface is provided for connection between the modem circuitry and a cellular telephone. An interlocking connector prevents electrical connection of the PSTN interface to the telephone line when connected to the cellular telephone interface.

22 Claims, 5 Drawing Sheets

COMMUNICATION CARD WITH TELEPHONE LINE INTERLOCK AND CELLULAR INTERCONNECT

BACKGROUND OF THE INVENTION

1. Field of the Invention

This invention relates to plug-in communication cards. More particularly, it relates to an interlock for a line-powered communication card which prevents the communication card from interfacing directly to the PSTN or other network when connected to a cellular device.

2. Background of Related Art

A modem is a device that generally transmits data between two processors. Modems are most frequently associated with a connection through a Plain Old Telephone Switch (POTS), otherwise known as the Public Switched Telephone Network (PSTN).

Communication card modems are available for many portable type devices such as laptop personal computers (PCs), and personal digital assistants (PDAs). One popular standard form-factor for a communication card modem is a Personal Computer Memory Card International Association (PCMCIA) Type I, II or IIII card, or PC Card, that plugs into virtually all portable computers and personal digital assistants (PDAs). Of course, multiple other standards exist, to which the present invention applies equally.

A PCMCIA card is a small, credit card size device which can generally contain anything from additional random access memory (RAM) to fax/modems to network interfaces. PCMCIA slots which accept a PCMCIA card are present on most new portable computers and many PDAs. Many different communication protocols may be present in PCMCIA communication card modems, either separately or in combination.

Initially, most PCMCIA or similar form communication card modems were designed to be connected only through a landline connection to the PSTN using an RJ-11 or RJ-45 telephone jack. U.S. Pat. No. 5,183,404 describes various configurations of what is commonly referred to as an 'XJACK'. The term XJACK is believed to have been derived from the extendibility of the RJ-11 telephone jack generally only in the x-direction. One embodiment of that patent is shown herein in FIG. 5.

In FIG. 5, an RJ-11 telephone jack 86 or similar type connector is formed within an XJACK extension arm 72. A guide track 96 is formed within the communication card modem 70 to allow the XJACK extension arm 72 to be either in a retracted position enclosing the RJ-11 telephone jack 86 within the case of the communication card modem 70, or in an extended position as shown in FIG. 5 with the RJ-11 telephone jack 86 being accessible outside of the main perimeter 71 of the communication card modem 70. To interconnect a cable between the PSTN and the XJACK extension arm 72 of the communication card modem 70, the XJACK extension arm 72 must be in an extended position as shown in FIG. 5. A cable cannot be inserted into the RJ-11 telephone jack 86 when the XJACK extension arm is in the retracted position.

An alternative to the XJACK is a ZJACK as disclosed in U.S. Pat. No. 5,499,923. The term 'ZJACK' refers to the rotatability of the RJ-11 connector in an extended position. FIG. 6 herein depicts one embodiment of the ZJACK as disclosed in that patent, wherein the RJ-11 or similar telephone jack 42, 46 is located at the end of a shank 22. The ZJACK is not only extendible in the x-direction, but is also rotatable out of the plane of the communication card 12 while in the extended position.

With the rise in popularity of both cellular telephones and portable computing devices such as PCs and PDAs came the need to allow interconnectivity between the communication card modem of a portable computing device and a cellular telephone for the purpose of transmitting data over the cellular network. Initially, cellular telephones were not capable of being plugged directly into the communication card modem of a PC or PDA designed for interconnection only to the PSTN. For instance, most cellular phones don't provide a dial tone required by many modems, or a ring voltage when the phone rings. Thus, cellular telephones did not include an RJ-11 or similar type telephone jack for direct connection to the PSTN.

To solve this need, a cellular data interface was developed to allow interconnection between a communication card modem of a PC or PDA, and a cellular telephone. To allow such interconnection, the cellular data interface generally includes circuitry for providing a dial tone and a ring voltage to the communication card modem. Because of this added circuitry, a separate connection in a communication card modem has been established for direct connection to a cellular telephone. This separate connection purposely is not an RJ-11 type jack, to prevent a inadvertent connection of the PSTN to the cellular data interface. Instead, the connection of the cellular data interface in a communication card modem is generally a recessed socket on an edge of the communication card modem, in addition to the XJACK. In this way, the communication card modem has the capability to connect either directly to the PSTN or directly to a cellular telephone, depending upon which socket on the communication card modem is used.

Many portable computer devices such as PCs and PDAs utilize modems for communications purposes. However, battery size and weight is an important consideration in the design and convenience of such devices. A balance must be reached between the size and weight of the overall device, dictated largely by the choice of battery, and an acceptable length of operation between charges.

Unfortunately, although operating an acceptable length of time when running typical application programs, portable computer devices utilize a large amount of power when communicating over a telephone line via a modem. The battery source which powers both the portable computer device and its modem is typically sized for general computer applications, and runs out of power quickly when actively communicating over a telephone line through a modem. Portable computer devices such as PCs, PDAs, and hand held PCs (HPC) are designed to operate up to several hours on a single battery charge, but operate only fractions of an hour on a single battery charge when communicating via modem. Thus, although portable computer devices operate a sufficient length of time for quick data transfers over a modem powered completely by a battery, they require that external ac power be applied to allow for longer uses of the modem. It is therefore desirable for battery powered computer devices including a modem to draw power, in addition to the inherent battery, from a second power source.

The DC power inherent in a telephone line provides a convenient source of power, but there are often limitations and restrictions which limit the ability of a modem to derive power from the telephone line. For instance, present regulation in the United States is such that significant current may only be drawn from the telephone line when the telephone or modem is off hook or active. In order to hold the telephone line in an off hook condition, current in the approximate range of 20 mA to 150 mA must be drawn. The maximum amount of current available from the telephone line is also limited.

Communication card modems which are powered at least in part by power drawn from the telephone line have been developed to conserve the battery power of portable computing devices such as a PC or PDA. These line-powered communication card modems extended significantly the service time of the portable device before the battery of the PC or PDA required recharging. However, line power is available only when the communication card modem is connected to the PSTN. Cellular telephones do not always provide power to a telephone line for use by the communication card modem. Therefore, when connected to a cellular telephone, even the line-powered communication card modem must be powered externally.

There is a need for a reliable mechanism to allow a communication card modem to utilize power from the PSTN when connected to the PSTN, and to allow the communication card modem to be powered from an external source such as the PC or PDA as necessary, e.g., when connected to many types of cellular telephones. There is also a need to prevent the erroneous condition of having an interconnection from the communication card modem both to the PSTN and to a cellular telephone at the same time.

SUMMARY OF THE INVENTION

In accordance with the principles of the present invention, an interlocking connector for a communication card comprises a first connection portion for connection to signals in the communication card relating to a first device such as a cellular telephone. A second connection portion in the interlocking connector provides for connection to signals in the communication card relating to a second device such as the PSTN. A blocking portion of the interlocking connector prevents electrical connection with the second connection portion and allows electrical connection with the first connection portion when the interlocking connector is connected to the communication card.

A communication card is also provided which comprises modem circuitry, and an interface for connection between the modem circuitry and a computing device. A PSTN interface is provided for connection between the modem circuitry and a telephone line, and a cellular telephone interface is provided for connection between the modem circuitry and a cellular telephone. An interlocking connector prevents electrical connection of the PSTN interface to the telephone line when connected to the cellular telephone interface.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The described embodiments of the present invention include a PCMCIA Type II communication card modem. However, it will be clear to those of ordinary skill in the art that the principles of the present invention relate to any form factor for a communication card capable of alternatively interfacing to either of alternative networks.

According to the principles of the present invention, a suitable interlocking mechanism prevents access to an XJACK, ZJACK, or other connector of a communication card modem while the communication card modem is connected to a cellular telephone. Similarly, when the communication card is connected to the PSTN it is not able to connect to the cellular telephone. In a further aspect of the present invention, the interconnect to the cellular telephone causes the communication card to be powered externally, whereas when connected to the PSTN the communication card utilizes power drawn from the telephone line. Thus, the present invention combines mechanical and electrical aspects to form a communication card modem with a PSTN interlock and cellular telephone interconnect capability.

The communication card modem of the present invention is either a voice band type modem or a broad band type modem such as a Digital Subscriber Line (DSL) type modem. Examples of broad band modems include High data rate Digital Subscriber Line (HDSL), Symmetric Digital Subscriber Line (SDSL), and Asymmetric Digital Subscriber Line (ADSL), which are collectively and generically referred to as "XDSL". HDSL and SDSL typically operate at T1 rates (1.544 Mb/s) or E1 rates (2.048 Mb/s). ADSL typically operates at 1.5 to 9 Mb/s in a downstream direction. Of course, the present invention is applicable with any type of voice band or broad band modem or other device capable of interfacing either to a network such as the PSTN or alternatively to a cellular telephone or other similar device.

Figure 1:
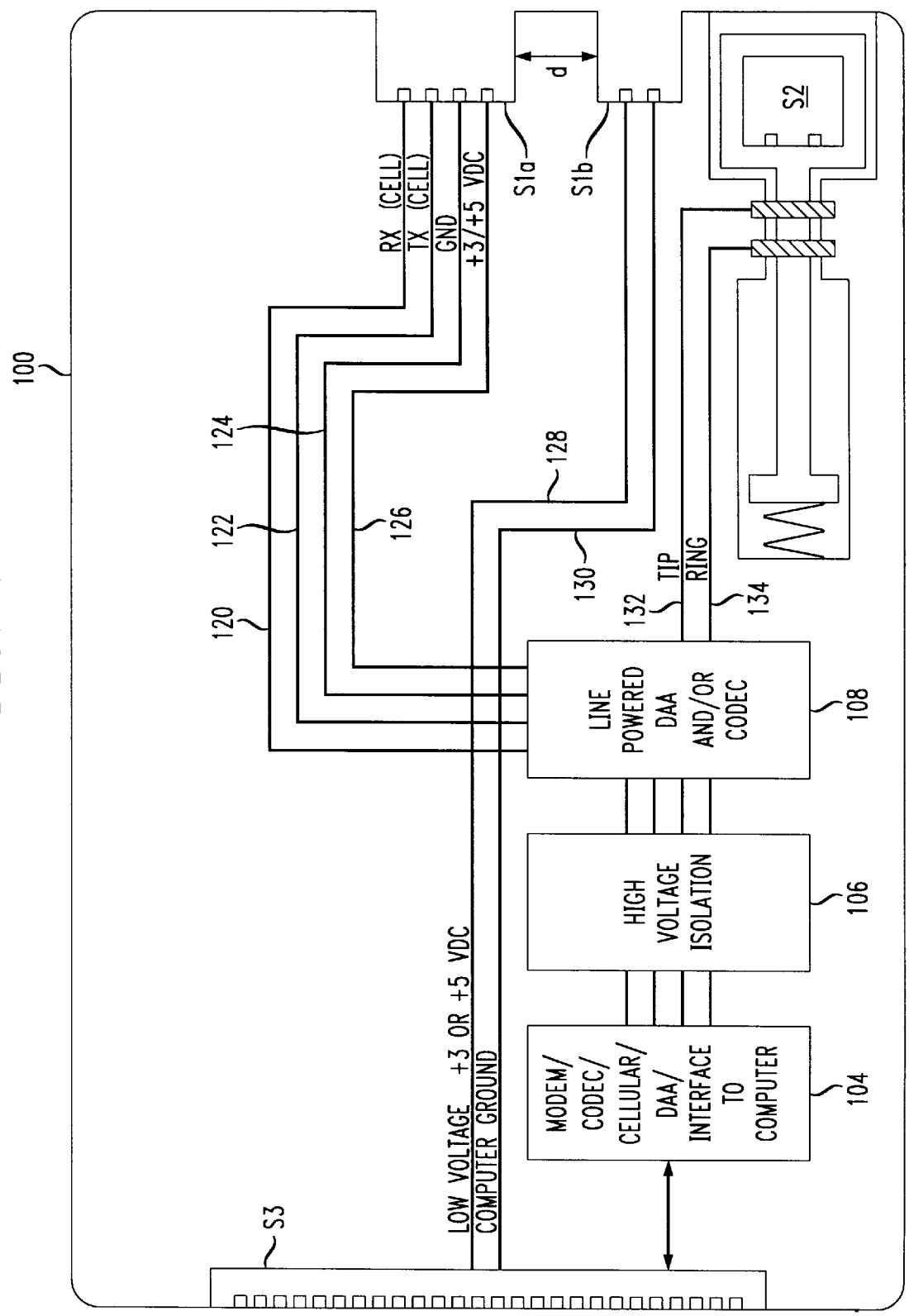
FIG. 1 shows a communication card modem capable of being powered from the PSTN when connected to the PSTN, and of being connected to a cellular telephone, according to a first embodiment of the present invention.

FIG. 1 depicts a block diagram of a communication card modem 100 which is in the shape of a PCMCIA Type II interface.

The communication card modem 100 shown in FIG. 1 includes a 68-pin connector S3 at one end of the communication card modem 100 for connection to a PCMCIA Type II slot in a PC or PDA. At the other end of the communication card modem 100 is a PSTN coupler S2 compatible with an RJ-11 cable connector. The PSTN coupler S2 is shown as a ZJACK as described in U.S. Pat. No. 5,499,923, the specification of which is incorporated herein by reference in its entirety. Of course, the specific connectors used may be altered within the spirit and principles of the present invention.

The communication card modem 100 includes a telephone line interface (TLI), data access arrangement (DAA), and/or codec 108 for interfacing directly to the PSTN or cellular telephone. High voltage isolation circuitry 106 protects the remaining circuitry from damage due to excess current or voltage on the telephone line. The interface to the PC or PDA through connector S3 includes a modem, codec, cellular DAA, or other interface 104.

In the preferred embodiment, power drawn from the telephone line is provided only to the line powered DAA and/or codec 108 as shown in FIG. 1. However, it is recognized and within the scope of the present invention to power additional circuitry in the communication card modem 100 as technology progresses to allow additional circuitry to be powered by the limited amount of current available from the telephone line.

Figure 2:
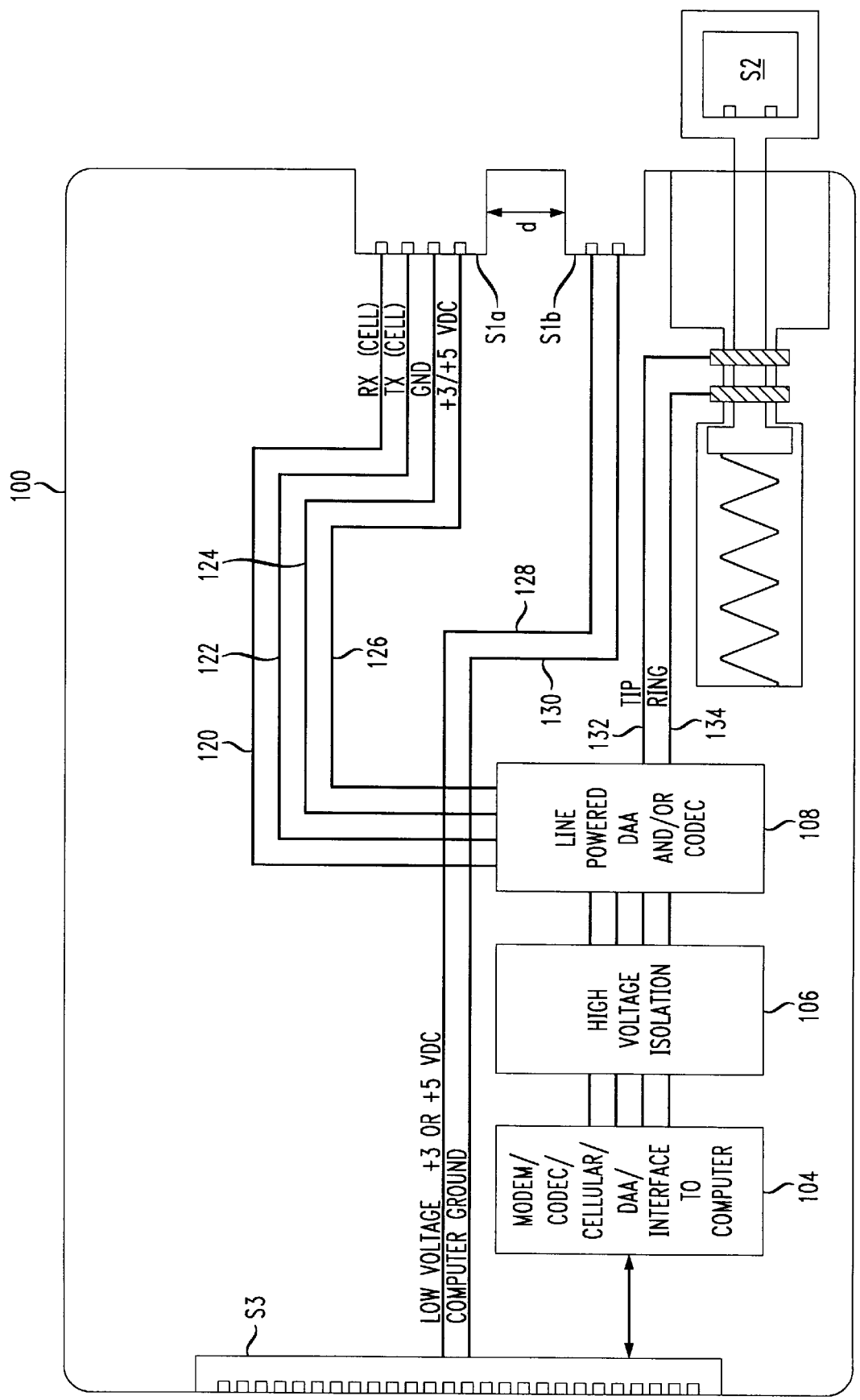
FIG. 2 shows the communication card modem of FIG. 1 with a ZJACK RJ-11 connector in an extended position for connection with the PSTN.

FIG. 2 shows the ZJACK S2 of the communication card modem 100 in an extended position for connection to the PSTN. The extension of the ZJACK S2 prevents (or interlocks) a mating connector (FIG. 3) from plugging into recessed sockets S1a, S1b.

When connected to the PSTN, power is derived from the PSTN telephone line plugged into ZJACK S2 in the line powered DAA and/or codec 108. The DM 108 may include transformers or other isolation devices which provide isolation and balance while minimizing signal distortion within communications networks. The DAA 108 provides a barrier preventing electrical contact between the communication card modem 100 and the central telephone equipment at the other end of the telephone line. Located close to the ZJACK S2, the transformers in the DAA 108 function as an isolation barrier that withstands high voltages between telephone lines, the rest of the modem circuitry, and the user. The DM 108 may alternatively be any SLIC chip or telephone interface accepting a common two or four-wire telephone input from a central telephone office.

The signal from the telephone line includes both an ac signal component and a dc power component, which is input to the tip 132 and ring 134 inputs of the DAA 108 via ZJACK S2. When connected to the PSTN, power is drawn and regulated from the telephone line, which has a known maximum current usage within the allowable limits. The power drawn from the telephone line for use by the line-powered communication card modem 100 is isolated from use by the PC or PDA plugged into the connector S3.

Figure 3:
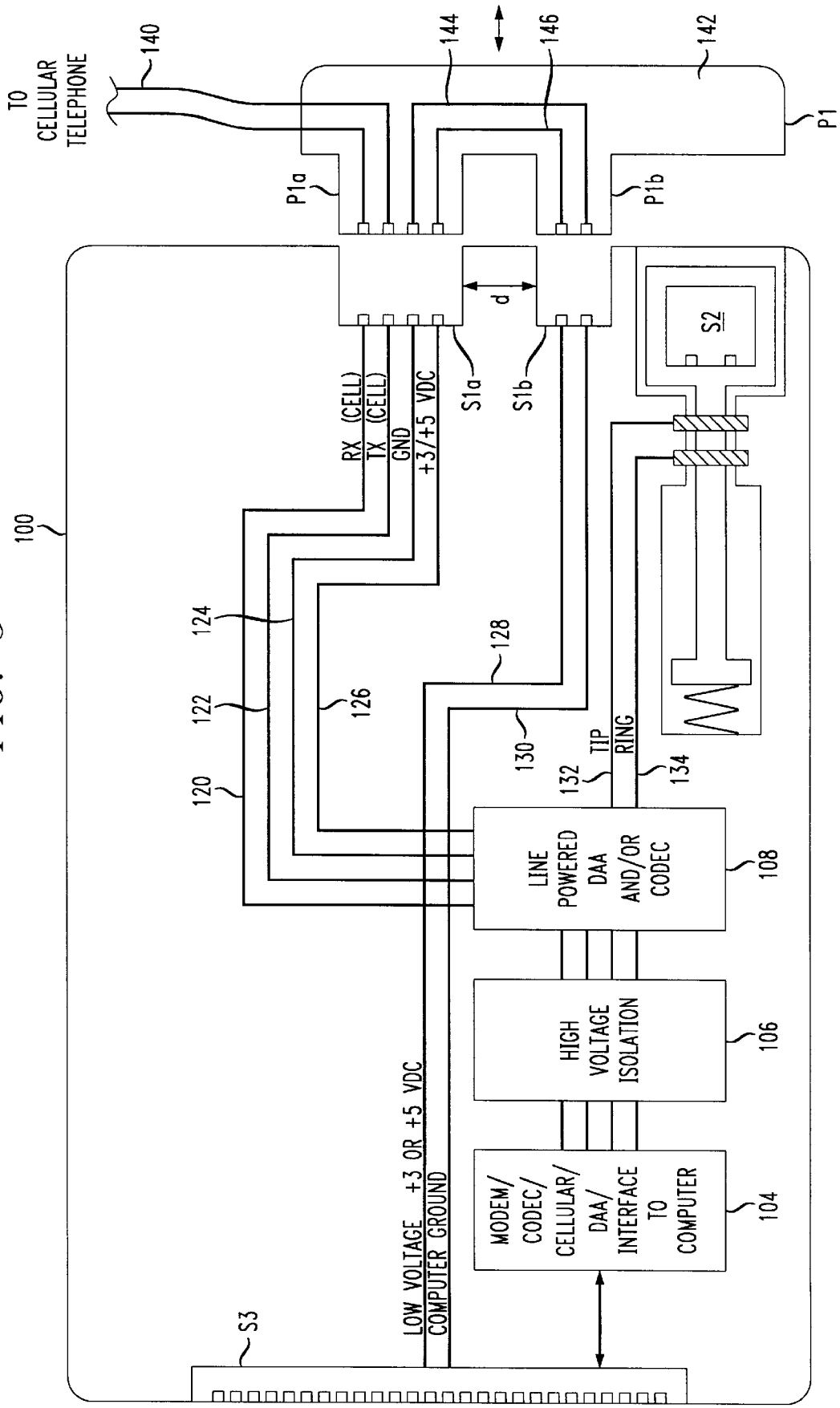
FIG. 3 shows the communication card modem of FIG. 1 with the ZJACK in a retracted position and prevented from extending to allow access to the PSTN by an interlocking connector which interconnects the communication card modem to a cellular telephone.

FIG. 3 shows the communication card modem 100 when connected to a cellular telephone.

In FIG. 3, an interlocking connector P1 having plugs P1a and P1b mates a wire 140 connected to the cellular telephone with the appropriate signals in the communication card modem 100, e.g., receive 120, transmit 122, ground 124 and power 126 signals. When inserted in the communication card modem 100, the interlocking connector P1 prevents extension of the ZJACK S2, thus preventing inadvertent connection of the communication card modem 100 to the PSTN when connected to a cellular telephone. Similarly, if the communication card modem 100 is already connected to the PSTN, the tail portion 142 of the interlocking connector P1 would prevent connection to the cellular telephone by preventing insertion of the interlocking connector P1 into the recessed socket S1a, S1b of the communication card modem 100.

When the ZJACK S2 is not extended, the plugs P1a, P1b of the interlocking connector P1 mate with corresponding sockets S1a, S1b in the front edge of the communication card modem 100. The interlocking connector P1 has a physical dimension including tail portion 142 that prevents the extension of the ZJACK RJ-11 coupler S2 when connected to a cellular telephone.

Interlocking connector P1 further includes wiring to allow the communication card modem 100 to be powered from the PC or PDA in which the communication card modem 100 is plugged into. Interconnect power wiring or circuitry 144, 146 in the interlocking connector P1 creates a connection between power wiring 128, 130 from the PC or PDA obtained through connector S3, and the power busses 124, 126 of the communication card modem 100. In this way, when the communication card modem 100 is connected to the PSTN via ZJACK S2, power is provided to the power busses 124, 126 of the communication card modem 100 by the DAA 108. When the communication card modem 100 is connected to a cellular telephone or other non-power providing device, power is provided to the power busses 124, 126 of the communication card modem by a completed connection to the power lines of the PC or PDA.

The interconnect power wiring or circuitry 144, 146 in the communication card modem 100 are embedded in the interlocking connector P1 and apply power to the line powered CODEC/DAA 108 during a cellular telephone call. The line powered CODEC/DAA 108 is dielectrically isolated from the unprotected computer power supply during a PSTN telephone call, when the communication card modem 100 derives all the necessary power for the CODEC/DAA 108 and potentially other devices from the telephone line. When making a cellular telephone call, interlocking connector P1 has an interlock formed by tail portion 142 to prevent application of loop current from PSTN. The interlocking connector P1 includes an interconnect from the low voltage unprotected power supply, via power lines 128, 130, to auxiliary power pins of the CODEC/DAA 108. The cellular telephone connection thus replaces PSTN power with the low voltage power obtained from the PC or PDA device into which the communication card modem 100 is inserted.

In addition to the interlock capability, the interlocking connector P1 and the mating recessed sockets S1a, S1b on the communication card modem 100 have physical spacing of contacts with a minimum of 3 to 4 mm between the low voltage and the high voltage sections of the circuit contacts. This separation between the unprotected computer supply and the protected PSTN line-powered supply is designed to meet international safety standards.

Figure 4:
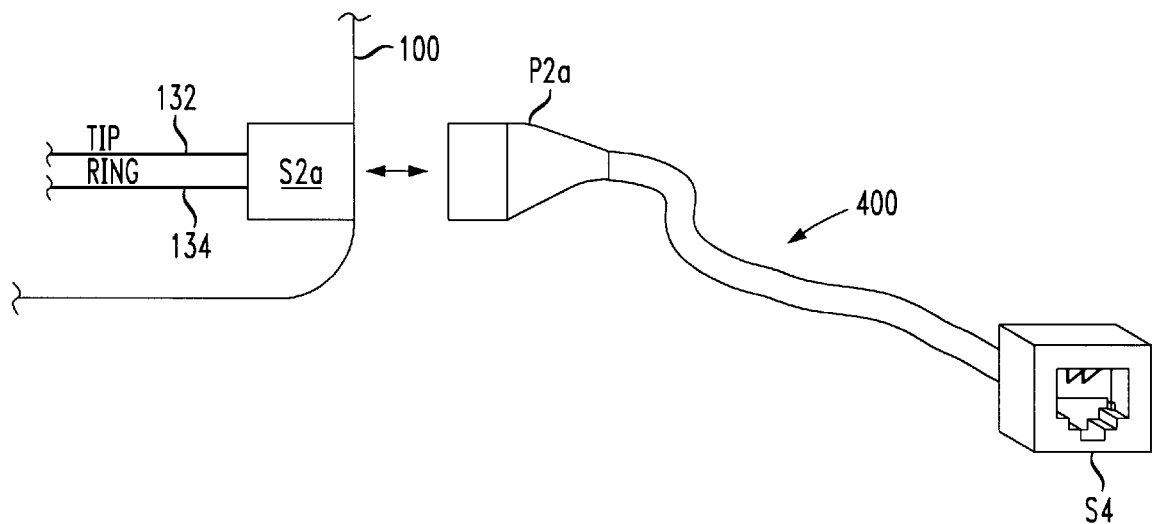
FIG. 4 shows an alternative connector to the PSTN according to a second embodiment of the present invention.
Figure 5:
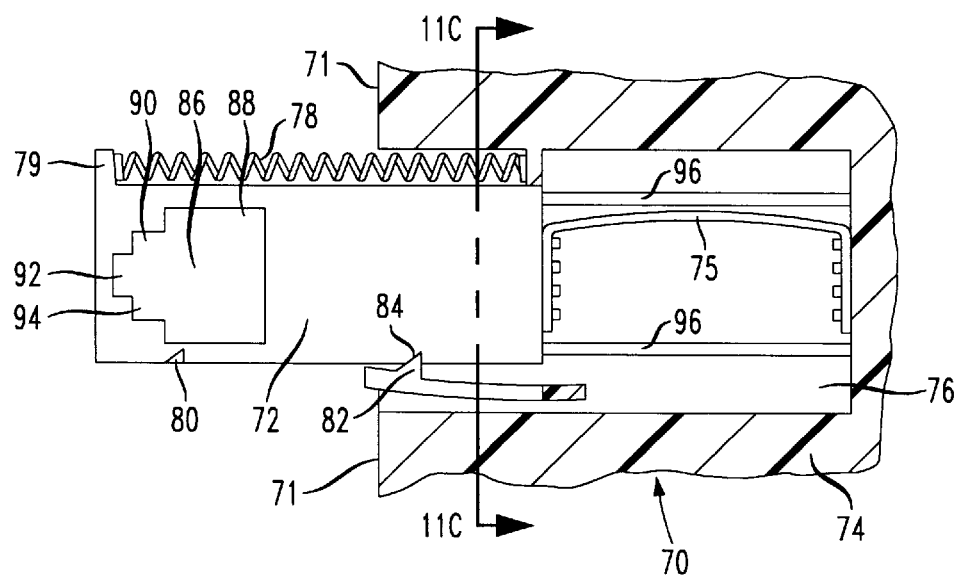
FIG. 5 shows a conventional XJACK RJ-11 connector in a communication card modem.
Figure 6:
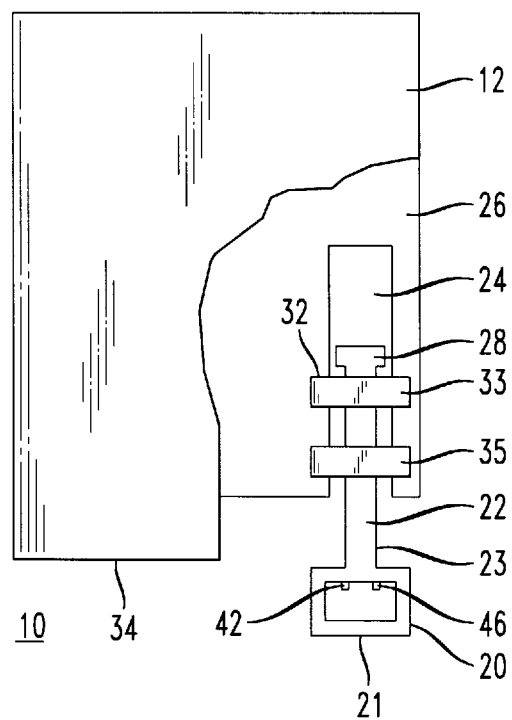
FIG. 6 shows an extendible and rotatable ZJACK RJ-11 connector in another conventional communication card modem.

FIG. 4 shows an alternative configuration for the connection to the PSTN. In particular, instead of the ZJACK RJ-11 connector S2 shown in FIGS. 1–3, a recessed socket S2a accepts a cable 400 which has a plug P2a on one end and a socket S4 at the other. The plug P2a on the cable 400 interconnects with the recessed socket S2a on the communication card modem 100, and the socket S4 accepts an RJ-11 cable connector or similar interface to the PSTN.

In the embodiment shown in FIG. 4, the interlocking connector P1, particularly the tail portion 142 when interconnected with the communication card modem 100, prevents the insertion of plug P2a of cable 400 from mating with the recessed socket S2a of the communication card modem 100. Similarly, if the plug P2a of cable 400 is already inserted into the communication card modem 100, then the interlocking connector P1 (FIG. 3) will not be allowed to be interconnected with the communication card modem 100.

While the invention has been described with reference to the exemplary preferred embodiments thereof, those skilled in the art will be able to make various modifications to the described embodiments of the invention without departing from the true spirit and scope of the invention

What is claimed is:

1. An interlocking connector for a communication card, comprising:
   a first portion to prevent access to a PSTN connection on said communication card when said interlocking connector is connected with said communication card; and a second portion to allow communication between a cellular telephone and said communication card when said interlocking connector is connected with said communication card.

2. The interlocking connector according to claim 1, further comprising:

circuitry allowing power from a computing device into which said communication card is inserted to power at least a portion of said communication card when said interlocking connector is connected with said communication card, said circuitry disconnecting power from said computing device to said communication card when said interlocking connector is disconnected from said communication card.

3. The interlocking connector according to claim 1, wherein:

said communication card is a communication card modem.

4. The interlocking connector according to claim 1, wherein:

said PSTN connection is an XJACK.

5. The interlocking connector according to claim 1, wherein:

said PSTN connection is a ZJACK.

6. The interlocking connector according to claim 1, wherein:

said first portion is a tail portion extending from said interlocking connector.

7. The interlocking connector according to claim 1, wherein:

said interlocking connector maintains a separation of at least 3 mm between a first set of signals containing interconnections to a cellular telephone, and a second set of signals containing power connections to a device into which said communication card is inserted.

8. The interlocking connector according to claim 1, wherein:

said interlocking connector maintains a separation of at least 4 mm between a first set of signals containing interconnections to a cellular telephone, and a second set of signals containing power connections to a device into which said communication card is inserted.

9. An interlocking connector for a communication card, comprising:

a first connection portion for connection to signals in said communication card relating to a first device;

a second connection portion for connection to signals in said communication card relating to a second device;

a blocking portion to prevent electrical connection with said second connection portion and to allow electrical connection with said first connection portion when said interlocking connector is connected to said communication card.

10. The interlocking connector for a communication card according to claim 9, wherein:

said first device is a cellular telephone.

11. The interlocking connector for a communication card according to claim 9, wherein:

said second device is a central telephone office of a public switched telephone network.

12. The interlocking connector for a communication card according to claim 9, further comprising:

circuitry allowing power from a computing device into which said communication card is inserted to power said communication card when said interlocking connector is connected to said communication card, said circuitry disconnecting power from said computing device to said communication card when said interlocking connector is disconnected from said communication card.

13. The interlocking connector for a communication card according to claim 9, wherein:

said interlocking connector maintains a separation of at least 3 mm between signals relating to said first device, and power connections to a computing device into which said communication card is inserted.

14. A communication card comprising:

modem circuitry;

an interface for connection between said modem circuitry and a computing device;

a PSTN interface for connection between said modem circuitry and a telephone line;

a cellular telephone interface for connection between said modem circuitry and a cellular telephone; and an interlocking connector which, when connected to said cellular telephone interface, prevents electrical connection of said PSTN interface to said telephone line.

15. The communication card according to claim 14, wherein:

said interlocking connector is removable from said communication card.

16. The communication card according to claim 14, wherein said interlocking connector further comprises:

circuitry allowing power from said computing device to power at least a portion of said communication card, said circuitry disconnecting power from said computing device to said communication card when said interlocking connector is disconnected from said communication card.

17. The communication card according to claim 14, wherein:

said communication card is a communication card modem.

18. The communication card according to claim 14, wherein:

said PSTN connection includes an XJACK.

19. The communication card according to claim 14, wherein:

said PSTN connection includes a ZJACK.

20. The communication card according to claim 14, wherein said interlocking connector comprises:

a tail portion to prevent said connection of said PSTN interface to said telephone line.

21. The communication card according to claim 14, wherein:

said interlocking connector maintains a separation of at least 3 mm between a first set of signals relating to interconnections to a cellular telephone, and a second set of signals relating to power connections to said computing device.

22. The communication card according to claim 14, wherein:

said communication card maintains a separation of at least 3 mm between a first set of signals relating to interconnections to a cellular telephone, and a second set of signals relating to power connections to said computing device.

* * * * *